United States Patent [19]

Jin

[11] 3,965,067

[45] June 22, 1976

[54] METHOD FOR PLASTICIZING SULFUR

[75] Inventor: Jung Il Jin, Irvington, N.Y.

[73] Assignee: Stauffer Chemical Company, Westport, Conn.

[22] Filed: Aug. 14, 1974

[21] Appl. No.: 497,357

[52] U.S. Cl. ............................ 260/45.8 A; 106/19; 106/287 SC; 260/79
[51] Int. Cl.² ............................................ C08K 5/00
[58] Field of Search.......... 106/19, 287 SC; 260/79, 260/42.24, 45.85 R, 45.85 T, 45.7 S, 45.8 A, 18 EP

[56] References Cited
UNITED STATES PATENTS

| | | |
|---|---|---|
| 3,440,064 | 4/1969 | Ludwing .............................. 260/79 |
| 3,635,880 | 1/1972 | Lamboy et al. ...................... 260/79 |
| 3,674,525 | 7/1972 | Louthan ............................... 260/79 |
| 3,676,395 | 7/1972 | Pied ..................................... 260/79 |

Primary Examiner—M. J. Welsh
Attorney, Agent, or Firm—Daniel S. Ortiz

[57] ABSTRACT

The invention is a method for plasticizing sulfur which comprises intimately intermixing a stabilized polymeric polysulfide, having a sulfur rank of from about 3.5 to about 5, with sulfur to form a plasticized sulfur composition.

8 Claims, No Drawings

METHOD FOR PLASTICIZING SULFUR

BACKGROUND OT THE INVENTION

Plasticized sulfur compositions are well known in the art. These compositions can be prepared by reacting from about 1 to 50 parts by weight of a polythiol with 100 parts by weight of sulfur. A basic catalyst is usually utilized to reduce the reaction time. Hydrogen sulfide is given off during the process.

The properties of the plasticized sulfur compositions are unpredictable since they are dependent upon the temperature of the reaction, the reaction time, the amount of catalyst used, the concentration of the polythiol, the nature of the polythiol and the temperature history of the reaction mixture. As disclosed in the U.S. Pat. No. 3,434,852, to provide a material within a usable viscosity range, it is the custom to introduce viscosity improving or viscosity reducing agents into the plasticized sulfur composition.

Whenever a plasticized sulfur composition is heated, the properties of the composition change. Viscosity improvers are added to the plasticized sulfur compositions to compensate for increases in viscosity which accompany heating said plasticized compositions. The visocosity of the molten plasticized sulfur compostions can be stabilized by introducing monomercaptans along with polythiols into the reaction mixture.

Plasticized sulfur compositions and their method of preparation are disclosed in U.S. Pat. Nos. 3,434,852; 3,734,753; 3,453,126 and British Patent 1,303,832.

It is an object of the present invention to provide a method for plasticizing sulfur without the liberation of hydrogen sulfide. It is also an object of the present invention to provide plasticized sulfur compositions with reproducible properties. It is a further object of the present invention to provide a method for rapidly preparing plasticized sulfur.

BRIEF DESCRIPTION OF THE INVENTION

According to the present invention, sulfur is plasticized by intimately admixing an effective amount of a stabilized polymeric polysulfide with sulfur. The stabilized polymeric polysulfides are reaction products of polythiols with sulfur and have a sulfur rank between about 3.5 and about 5; preferably, between about 3.5 and 4.5 most preferably about 4. The stabilized polysulfide can be intermixed with the sulfur by melting with the sulfur, by calendering on heated rolls or other means suitable for intermixing the two materials.

DETAILED DESCRIPTION OF THE INVENTION

The sulfur to be plasticized is intimately intermixed with a stabilized polysulfide composition having a sulfur rank of between about 3.5 and 5 and preferably between about 3.5 and 4.5 and most preferably about 4.

The weight ratio of the stabilized polysulfide:sulfur required to plasticize the sulfur is dependent upon the particular stabilized polysulfide utilized and the properties desired in the plasticized sulfur composition. Usually ratios of from about 3 parts, stabilized polysulfide to 97 parts sulfur to about 60 parts stabilized polysulfide to about 40 parts sulfur are sufficient to provide a product having a desirable range of physical properties. The plasticized sulfurs prepared by the process of the invention exhibit increased tensile strength and decreased hardness in comparison to unplasticized sulfur.

The stabilized polysulfides with a sulfur rank of from about 3.5 to 5 are prepared by reacting a polythiol with sulfur in a mole ratio of from about 1.25 to about 2 moles of sulfur per thiol group in the polythiol composition. The sulfur is reacted with the polythiol composition in a temperature range of from about 100°C to about 200°C and preferably about 130 C to about 170°C. The reaction is usually permitted to proceed for from about 10 minutes to about 10 hours or until a reaction mixture with the desired viscosity is formed.

The polythiols disclosed in U.S. Pat. No. 3,434,852 and U.S. Pat. No. 3,734,753 are useful in the practice of the present invention. It is preferred however to use dithiols or dithiols with up to about 30% of trithiols and tetrathiols mixed therewith.

The preferred polythiols for use in the practice of the present invention are compounds of the formula $A(SH)x$ wherein A is a radical having a valence of $x$ and contains 2 to about 30 carbon atoms, preferably 2 to about 20 carbon atoms inclusive. Each of said carbon atoms preferably having attached thereto not more than one SH group, said radical A being selected from the group consisting of (a) radicals containing carbon and hydrogen only, (b) radicals containing carbon, hydrogen and oxygen only, the oxygen being present as ether linkages, (c) radicals containing carbon, hydrogen and sulfur, the sulfur being present as monosulfide linkages and (d) radicals containing carbon, hydrogen, sulfur and oxygen wherein the sulfur is present as monosulfide linkages and the oxygen is present as ether linkages, (e) mixtures thereof; $x$ is an integer of from 2 to 4 inclusive and preferably 2 or 3.

Typical radicals containing carbon and hydrogen include saturated aliphatic, saturated cycloaliphatic, aromatic and combinations thereof.

Typical radicals containing carbon, hydrogen and oxygen, the oxygen being present as ether linkages include saturated aliphatic, saturated cycloaliphatic, and aromatic radicals connected by one or more ether linkages.

Typical radicals containing carbon, hydrogen and sulfur; the sulfur being present as monosulfide linkages include saturated aliphatic, and saturated cycloaliphatic connected by one or more monosulfide linkages.

Preferred compounds for preparation of the stabilized polysulfide compositions are compounds such as: 1,2-ethane-dithiol, 1,2-propanedithiol, 1,3-propanedithiol, 1,4-butane-dithiol, 1,2,3-propanetrithiol, bis(2-mercaptoethyl) ether, bis(3-mercaptopropyl) ether, bis(2-mercaptoethyl)sulfide, bis(3-mercaptopropyl)sulfide, 2-mercaptoethyl-4-mercaptocyclo-hexylsulfide, bis(3-mercaptocyclopentyl)sulfide, 1,6-hexanedithiol, 1,20-eicosyldithiol, bis(3,6-dioxa-8-mercaptooctyl)sulfide and the like.

The polythiol composition is reacted with sulfur in the presence of a basic catalyst at a temperature above the melting point of sulfur. The basic catalysts useful in the practice of the present invention are materials such as calcium carbonate, sodium carbonate & tertiary amines; basic oxides such as calcium oxide & titanium dioxide; alkali metal sulfides such as sodium sulfide, potassium sulfide and the like. The basic catalyst acts as a proton acceptor, under the conditions of the reaction. Useful catalysts remain in the reaction mixture during the reaction.

Although it is preferred to utilize a catalyst to carry out the reaction, a catalyst is not required if prolonged reaction times are not objectionable.

The reaction can be readily carried out by mixing the sulfur and catalyst with the polythiol or by melting a mixture of the catalyst with the sulfur and introducing the polythiol into the molten reaction mixture. The reaction can be carried out in the presence of a solvent, but a solvent is not required. If a solvent is utilized the solvent is usually removed before the polysulfide is intermixed with the sulfur to be plasticized.

The polysulfide composition determines the properties which are imparted to the plasticized sulfur composition. Relatively short chain length polysulfide compositions provide a soft, flexible plasticized sulfur. Long chain length polysulfides which have some cross linking due to the addition of tri and tetrathiols provide a harder more rigid plasticized sulfur composition. The cross linking tends to add strength to the plasticized sulfur composition. The desired end use for the plasticized sulfur determines the molecular weight of the stabilized polysulfide and the amount of cross linking which may be required to impart the desired properties to the plasticized sulfur compositions. Since the characterization of the stabilized polysulfide composition is determined by the end use of the plasticized sulfur composition, one skilled in the art can determine the chain length of the stabilized polysulfides and the amount of cross linking, if any, required.

In the preparation of the stabilized polysulfide composition, the polythiol is reacted with sulfur at an elevated temperature until a polysulfide having the required viscosity is formed. Further reaction is stopped by the addition of stabilizing agents such as epoxide compositions or acid anhydride compositions as disclosed in copending application of Jin & Hwa Ser. No. 497,360 filed on the same date as the present application or a monomercaptan composition to the reaction mixture. The epoxide and the acid anhydride compositions are added to the reaction mixture at the time the polysulfide is to be stabilized. The monomercaptan composition can be added to the original reaction mixture or can be subsequently added after the reaction has proceeded for a time and is calculated to provide a stabilized polysulfide composition with the required physical properties. Other materials which are known to terminate polysulfide reactions can be utilized in the process. It is preferred to utilize an epoxide or acid anhydride composition to stabilize the polysulfide since the epoxide and anhydride stabilized compositions have a more agreeable odor than compositions stabilized with a mercaptan composition.

In general, the epoxide compounds useful in the practice of the present invention are those having one or more three membered heterocyclic rings containing one oxygen atom and two carbon atoms. The preferred compounds are included within the following general formula:

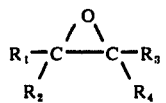

wherein $R_1$, $R_2$, $R_3$ and $R_4$ are independently selected from the group consisting of hydrogen, alkyl groups containing from 1 to about 10 carbon atoms, cycloalkyl groups, aryl groups, hydroxy groups and various derivatives of the aforementioned groups, particularly derivatives containing oxy and/or oxo linkages. The preferred class of epoxides are mono-epoxides which include alkylene oxides such as ethylene oxide, propylene oxide, butylene oxide, substituted alkylene oxides, cycloalkylene oxides, such as cyclohexane oxide, epoxidized vegetable oils having only one epoxide group, aryl epoxides such as 1,2-epoxyethylbenzene, 1,2-epoxy-3-phenoxypropane and the like. Diepoxides can be utilized to stabilize the polysulfides but they must be provided in excess to terminate the reaction.

Anhydrides of alkyl or aryl acids can also be utilized to stabilize the polysulfide composition. Acid anhydride compositions such as phthalic anhydride, acetic anhydride, propionic anhydride, succinic anhydride, malonic anhydride and the like are useful for stabilizing the polysulfide compositions useful in the practice of the present invention.

The stabilized polysulfide compositions useful in the practice of the present invention can vary from a soft, flexible, rubber-like character to a hard, tough resilient character depending upon the desired properties of the plasticized sulfur composition.

The stabilized polysulfide composition is intimately intermixed with sulfur in a ratio in the range of from about 3:97 to about 6:4 parts stabilized polysulfide composition to sulfur by weight. The amount of stabilized polysulfide introduced into the sulfur is dependent upon the characteristics desired in the plasticized sulfur composition.

The stabilized polysulfide composition can be intimately intermixed with the sulfur by mixing with molten sulfur, by putting the material on calender rolls, by solution in a solvent with subsequent evaporation of the solvent or other means known for intimately intermixing materials.

The plasticized sulfur compositions of the present invention are useful in that the character of the plasticized sulfur does not change after heating or manipulation of the plasticized mixture. In addition hydrogen sulfide is not produced when the stabilized polysulfide is intermixed with sulfur and prolonged heating and mixing times are not required.

The stabilized polysulfide does not react with the sulfur if the rank is about 4. If the rank is below about 4, the stabilized polysulfide will react with the sulfur to form a stabilized composition with a rank of about 4. If the rank is above 4, the material is unstable and when it is intermixed with the sulfur forms a stabilized composition with a rank of about 4. The stabilized polysulfide composition with a rank of about 4 can be recovered from the plasticized sulfur composition. When the stabilized polysulfide has a sulfur rank of about 4, it remains unchanged in the admixture with sulfur. Properties such as the glass transition temperature remain unchanged while the stabilized polysulfide is admixed with the sulfur and after it has been recovered from the sulfur.

The character of the plasticized sulfur is determined by the type of stabilized polysulfide composition intermixed with the sulfur. One advantage of the method of the present invention is that the stabilized polysulfide composition can be prepared at one location and intermixed with the sulfur to be plasticized at aother location of use and provide plasticized sulfur with predictable characteristics.

The method is also advantageous in that no hydrogen sulfide is evolved when the stabilized polysulfide plasticizer is intermixed with sulfur. Liberation of hydrogen sulfide by the reaction of plasticizer with sulfur is an objectionable feature of the prior art processes when they are utilized to prepare plasticized sulfur at point of use such as road marking, laying bricks or other uses which require preparation in populated areas.

Plasticized sulfur compositions are useful in applications such ss laying bricks, marking roads, coating soluble fertilizer particles to reduce the rate of solution, and for many structural uses such as sewer pipes and the like.

The process of the present invention can be illustrated by reference to the following examples:

EXAMPLE 1

A mixture of 24 grams (0.75 mole) mole) of sublimed sulfur and 0.5 grams of $TiO_2$ catalyst was heated to 120°C. With stirring, 33.56 grams (0.24 mole) of $\beta,\beta'$-dimercaptodiethyl ether (DMDEE) was added to the molten mixture in a period of 40 minutes during which time the temperature of reaction mixture was raised to 155°C. After the addition of DMDEE was over, the reaction mixture was permitted to remain at 155°C. for an additional 20 minutes. At this time, 0.9 grams of styrene oxide was added to the mixture and allowed to react for 30 minutes. The reaction product was a readily flowing liquid at 130°–150°C. It formed a homogeneous mixture with molten sulfur. The viscosity did not increase after the styrene oxide was added to the reactive mixture.

EXAMPLE 2

To 24 grams (0.75 mole) of molten sulfur at 140°C., a mixture of 33.56 (0.24 mole) of DMDEE and 6.75 grams of Union Carbide's diepoxide, ERL-4221 (3,4-epoxycyclohexylmethyl-3,4-epoxycyclohexane carboxylate) was added slowly over a period of 50 minutes with gentle stirring. Throughout the addition, the temperature of the mixture was maintained between 135°–140°C. After the addition of DMDEE and epoxide the temperature of the reaction mixture was raised to 140°–150°C. and kept there for 1 hour and 20 minutes. One gram of phthalic anhydride was mixed with the reaction mixture and the mixture was maintained at 140°–150°C. for 30 minutes. The product was an easily flowing liquid at 130°–150°C. It formed a homogeneous mixture with molten sulfur. The texture of the resulting sulfur mixture depended on the level of the product in the final mixture.

When the stabilized polysulfide was cooled to room temperature, it was a soft rubbery material.

The diepoxide utilized in Example 2 is not used in sufficient quantity to be a chain terminating agent. The diepoxide enters into the reaction with the dimercapto diethyl ether to form the polysulfide material. The polysulfide material after addition of the phthalic anhydride remains unchanged as to characteristics such as viscosity, elasticity, tensile strength and hardness over several heating and cooling cycles.

EXAMPLE 3

One gram of polysulfide polymer prepared in Example 1 was mixed with 10 grams of sublimed sulfur at 125°C. with the formation of a homogeneous low viscosity liquid.

Three grams of urea powder were coated by 0.6 grams of the molten mixture. A uniform yellow coating of the ures powder was obtained.

EXAMPLE 4

To 85 parts of molten sulfur were added 15 parts of the molten product of Example 1. The molten mixture was cast into discs 2 inches in diameter and 0.68 inches thick and cooled to room temperature. The cast discs had a Shore D hardness of 40 and an impact strength of 16 inch pounds.

EXAMPLE 5

Mixture of the product of Example 1 with various proportions of molten sulfur were prepared at 120°–150°C. The mixtures were cooled and the glass transition temperature and texture of the cooled product were monitored. Table I presents the results of the tests.

Table I

| % Product of Example 1 | Glass Transition Temperature | Texture of Cooled Mixture |
|---|---|---|
| 100 | −41°C. | Very Soft |
| 80 | −40°C. | Soft |
| 47 | −41°C. | Soft |
| 30 | −39°C. | Firm |
| 15 | −40°C. | Hard |

The glass transition temperature was measured by differential thermal analysis.

The above table illustrates that the stabilized polysulfide polymer remains unchanged when incorporated into the sulfur. Since no reaction with the sulfur occurs, the properties of polysulfide polymer-sulfur mixture can be duplicated by subsequent mixtures in the same proportions of the stabilized polysulfide polymer.

EXAMPLE 6

A mixture of 85.5 grams (2.67 moles) of sulfur and 0.1 grams of $TiO_2$ catalyst were heated to 145°C. To the stirred molten mixture of sulfur and $TiO_2$ was added 62.8 grams (0.67 mole) of ethane dithiol ($HSCH_2CH_2SH$) over a period of 1.5 hours. After the addition of the ethane dithiol was completed the reaction mixture was maintained at 145°C. for an additional three hours. At this time 0.5 grams of phthalic anhydride was added to the reaction mixture. The mixture was then maintained at 145°C for 0.5 hours. The viscous reaction mixture was poured into a pan and cooled to room temperature. The cooled product was a soft, rubber-like yellow material.

The molten product mixed easily with molten sulfur over a wide range of proportions.

EXAMPLE 7

To a stirred mixture of 9.7 grams (0.030 mole) of sulfur and 0.1 grams $TiO_2$ at 140°C. are added 13.39 grams (0.097 mole) of dimercapto diethyl ether and 1.03 grams (0.003 mole) of Trimethylolethane trithioglycolate

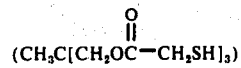

over a 1 hour period. The mixture is reacted at 140°C. for an additional 3 hours. Then 0.2 grams of styrene oxide are added to the reaction mixture. The reaction mixture is permitted to remain at 140°C. for 30 minutes after the addition of the styrene oxide. After the addition of the styrene oxide the viscosity of the mixture does not increase.

The reaction mixture is cooled and forms a rubber-like material.

What is claimed is:

1. A process for plasticizing sulfur which comprises intimately intermixing a stabilized polysulfide composition having a sulfur rank of from about 3.5 to 5 with sulfur in a ratio by weight of stabilized polysulfide to sulfur of from about 3:97 to about 6:4.

2. The process of claim 1 wherein said stabilized polysulfide composition is molten and is intermixed with molten sulfur.

3. The process of claim 1 where said stabilized polysulfide composition is intermixed with a solution of sulfur.

4. The process of claim 1 wherein said stabilized polysulfide composition has an average sulfur rank of from about 3.5 to 4.5.

5. The process of claim 1 wherein said stabilized polysulfide composition has an average sulfur rank of about 4.

6. A plasticized sulfur composition comprising an epoxide stabilized polysulfide and sulfur in a ratio by weight of about 3:97 to about 6:4 parts of said stabilized polysulfide to said sulfur.

7. The composition of claim 6 wherein the epoxide is a monoepoxide.

8. A plasticized sulfur composition comprising a stabilized polysulfide and sulfur in a ratio by weight of about 3:97 to about 6:4 parts of said stabilized polysulfide to said sulfur wherein said polysulfide is stabilized by an acid anhydride selected from the group consisting of acetic anhydride, propionic anhydride, succinic anhydride and malonic anhydride.

* * * * *